United States Patent [19]
Stevens

[11] Patent Number: 6,064,626
[45] Date of Patent: May 16, 2000

[54] PERIPHERAL BUSES FOR INTEGRATED CIRCUIT

[75] Inventor: Ashley Miles Stevens, Cambridge, United Kingdom

[73] Assignee: Arm Limited, Cambridge, United Kingdom

[21] Appl. No.: 09/127,605

[22] Filed: Jul. 31, 1998

[51] Int. Cl.[7] .................................................. G11C 13/00
[52] U.S. Cl. ...................................... 365/233; 365/189.04
[58] Field of Search .......................... 365/230.01, 230.03, 365/233, 189.04

[56] References Cited

U.S. PATENT DOCUMENTS 5,959,935   9/1999   Pascucci ................................... 365/233

*Primary Examiner*—Terrell W. Fears
*Attorney, Agent, or Firm*—Nixon & Vanderhye P.C.

[57] ABSTRACT

The present invention provides an integrated circuit comprising a system bus to which a processor is connectable, and first and second peripheral buses to which peripheral units used by said processor are connected, the first peripheral bus operating at a higher clock speed than the second peripheral bus. Further, the integrated circuit comprises bridge logic for providing an interface between the system bus and the peripheral buses to enable signals to be passed between the system bus and the peripheral buses, the bridge logic comprising clock resynchronisation logic for synchronising the system bus and the peripheral buses.

Through the provision of first and second peripheral buses operating at different clock speeds, the integrated circuit of the present invention provides a great deal of flexibility for reducing the power consumption of the integrated circuit as compared with a similar integrated circuit having only one peripheral bus. Since the power consumption of each peripheral bus is proportional to the clock frequency and capacitance, significant power consumption savings can be realised by ensuring that each peripheral unit is connected to the slowest peripheral bus appropriate for that peripheral unit.

11 Claims, 4 Drawing Sheets

PERIPHERAL BUSES FOR INTEGRATED CIRCUIT

BACKGROUND OF THE INVENTION

1. Field of the Invention

The present invention relates to integrated circuits of the type having a system bus to which a processor is connectable and a peripheral bus to which one or more peripheral units are connected.

2. Description of the Prior Art

It is known to provide an integrated circuit with a system bus to be used for high performance system modules, and a peripheral bus to be used for low power peripheral devices. The system modules, such as a processor, a Direct Memory Access (DMA) controller, etc may typically be provided as part of the integrated circuit, but alternatively one or more of such system modules may be provided off-chip. Similarly, the peripheral devices that connect to the peripheral bus may be provided within the integrated circuit, or alternatively may be provided off-chip. However, for the peripheral devices that are provided off-chip, there will typically be provided some corresponding on-chip logic that is connected to the peripheral bus, and is used to interface with the peripheral device. Hence, for the purpose of the present description, the term "peripheral unit" will be used to refer to the logic provided within the integrated circuit and connected to the peripheral bus, irrespective of whether that logic is actually the peripheral device itself, or a piece of interface logic used to interface with a peripheral device provided off-chip.

The system bus is typically a high performance bus, which supports the efficient connection of processors, on-chip memories and off-chip external memory interfaces with low power peripheral macrocell functions. The peripheral bus, on the other hand, is a low power bus, arranged to reduce power consumption and interface complexity to support peripheral functions. It enables multiple peripheral units to be connected without loading the main system bus, which would adversely affect the operation of the system bus. Typically, the system bus and peripheral bus operate at the same clock speed, and any clock resynchronisation required due to the particular operating speed of a peripheral unit is performed at that peripheral unit.

When developing integrated circuits, the issue of power consumption is very important. It is becoming more commonplace for such integrated circuits to be used in products which operate from battery power, such as portable laptop computers, mobile phones, personal organizers, etc. In such situations, it is clearly desirable to reduce the power consumption of the integrated circuits as much as possible, in order to improve the battery life of the products, i.e. the amount of time the products can be used for before needing to replace or recharge the batteries. However, it should be noted that it is not just in the area of battery powered products where power consumption is a concern, and there is generally a desire to reduce power consumption wherever possible. For example, by reducing power consumption, it is also possible to reduce heat generation, and hence reduce the need for heat dissipating elements such as fans and heat sinks to be provided, thereby reducing cost and size.

Although the provision of a peripheral bus enables the power consumption of the integrated circuit to be reduced, the actual reduction in power consumption is dependent on the number of peripheral units connected to the peripheral bus. Increasingly, there is a need for such integrated circuits to support more and more peripheral units, and the more peripheral units connected to the peripheral bus, the higher the capacitance of the peripheral bus. Since the power consumption of the peripheral bus is proportional to the capacitance of the bus, it is clear that the power consumption of the peripheral bus increases as more and more peripheral units are connected to it, and hence the overall power savings of the integrated circuit are reduced.

Accordingly, it is an object of the present invention to provide a technique which enables power consumption to be reduced with respect to the power consumption of such prior art integrated circuits.

SUMMARY OF THE INVENTION

Accordingly, the present invention provides an integrated circuit comprising: a system bus to which a processor is connectable; first and second peripheral buses to which peripheral units used by said processor are connected, said first peripheral bus operating at a higher clock speed than said second peripheral bus; bridge logic for providing an interface between said system bus and said peripheral buses to enable signals to be passed between said system bus and said peripheral buses, said bridge logic comprising clock resynchronisation logic for synchronising said system bus and said peripheral buses.

In accordance with the present invention, the integrated circuit has a system bus to which a processor is connectable, and first and second peripheral buses to which peripheral units used by the processor are connected, the first peripheral bus being arranged to operate at a higher clock speed than the second peripheral bus. Further, bridge logic is provided to form an interface between the system bus and the peripheral buses, with the bridge logic comprising clock resynchronisation logic to synchronise the system bus and the peripheral buses.

Since the integrated circuit in accordance with the present invention has two peripheral buses, with the first peripheral bus operating at a higher clock speed than the second peripheral bus, there is now a choice as to which peripheral bus any particular peripheral unit is connected to. The power consumption of each peripheral bus is proportional to the clock frequency and capacitance, and hence, for any particular loading, the peripheral bus operating at a higher clock speed will tend to consume more power than the peripheral bus operating at a lower clock speed. Accordingly, the integrated circuit in accordance with the present invention, through the provision of first and second peripheral buses operating at different clock speeds, provides a great deal of flexibility for reducing the power consumption of the integrated circuit as compared with a similar integrated circuit having only one peripheral bus. To optimise the power consumption savings, each peripheral unit is connected to the slowest peripheral bus appropriate for that peripheral unit. The capacitive load on the first, higher speed, peripheral bus is kept to a minimum by connecting as few peripheral units to that higher speed bus as possible. Although this may mean that a relatively large number of peripheral units are connected to the second, slower, peripheral bus, and hence the capacitive load of the second peripheral bus is high, since the clock speed is slower than that of the first peripheral bus, the power consumption is still acceptable.

It will be appreciated that the bridge logic that is arranged to provide an interface between the system bus and the peripheral bus may be embodied as a single logic unit. However, in preferred embodiments, said bridge logic comprises first and second bridge logic units, said first bridge logic unit being arranged to provide an interface between said system bus and said first peripheral bus, and said second bridge logic unit being arranged to provide an interface between said system bus and said second peripheral bus.

Further, said first peripheral bus is preferably arranged to operate at the same clock speed as said system bus, and said clock resynchronisation logic is provided in said second bridge logic unit, but not in said first bridge logic unit. It will be appreciated that if the first peripheral bus is operating at the same clock speed as the system bus, there is no need to provide the first bridge logic unit with resynchronisation logic.

In embodiments where the first peripheral bus is arranged to operate at the same clock speed as the system bus, then the first peripheral bus can be arranged to support direct memory access (DMA), with peripheral units requiring DMA being connected to that first peripheral bus. DMA is supported on the first peripheral bus by transferring data between the system bus and the first peripheral bus. Since the first peripheral bus runs at the same clock speed as the system bus, no data buffering is needed in the bridge logic providing the interface between the system bus and the first peripheral bus. In preferred embodiments, the second peripheral bus does not support DMA, because the second peripheral bus is clocked at a speed unrelated to the system bus, and therefore to transfer data from the system bus to the second peripheral bus requires data buffering to be provided within the bridge logic. However, this is not a significant limitation, since the relatively slow speed peripheral units typically connected to the second peripheral bus do not require DMA.

In preferred embodiments, a number of said peripheral units require a common clock speed and are connected to said second peripheral bus, said second peripheral bus being arranged to operate at said common clock speed, thereby avoiding the requirement for separate clock resynchronisation logic to be provided at each of said number of peripheral units. This approach saves on logic and also saves power, since the need for multiple synchronisers associated with each peripheral unit is avoided, and instead the resynchronisation is achieved centrally by clock resynchronisation logic provided within the bridge logic.

In preferred embodiments, said first and said second peripheral buses employ the same bus protocol, the system bus employs a different bus protocol, and the bridge logic includes protocol conversion logic for performing the necessary protocol conversion on signals passed between the system bus and the peripheral buses.

Preferably, said second peripheral bus operates at a clock speed chosen so as to enable a commonly used clock speed required by a number of said peripheral units to be generated. Typically, the clock speeds required by the peripheral units will be integer divisions of the clock speed chosen for the second peripheral bus. In preferred embodiments the second peripheral bus operates at a clock speed of 3.68 MegaHertz.

In preferred embodiments of the present invention, two peripheral buses are provided within the integrated circuit. However, in alternative embodiments, the integrated circuit further comprises one or more additional peripheral buses arranged to operate at clock speeds different to the clock speeds of said first and said second peripheral buses. It will be appreciated that this provides further flexibility in the location of each peripheral unit. Hence, if there are a number of different groups of peripheral units, with each group containing peripheral units arranged to operate at a particular clock speed, then a separate peripheral bus can be provided for each group, and can be arranged to operate at the appropriate clock speed, thereby avoiding the need for any clock resynchronisation to be performed at a particular peripheral unit. As mentioned earlier, this yields savings in both logic and power consumption.

The integrated circuit of the present invention may be used for a variety of purposes. However, in preferred embodiments, the integrated circuit is a microcontroller.

BRIEF DESCRIPTION OF THE DRAWINGS

The present invention will be described, further by way of example only, with reference to a preferred embodiment thereof as illustrated in the accompanying drawings, in which.

DESCRIPTION OF A PREFERRED EMBODIMENT

Figure 1:
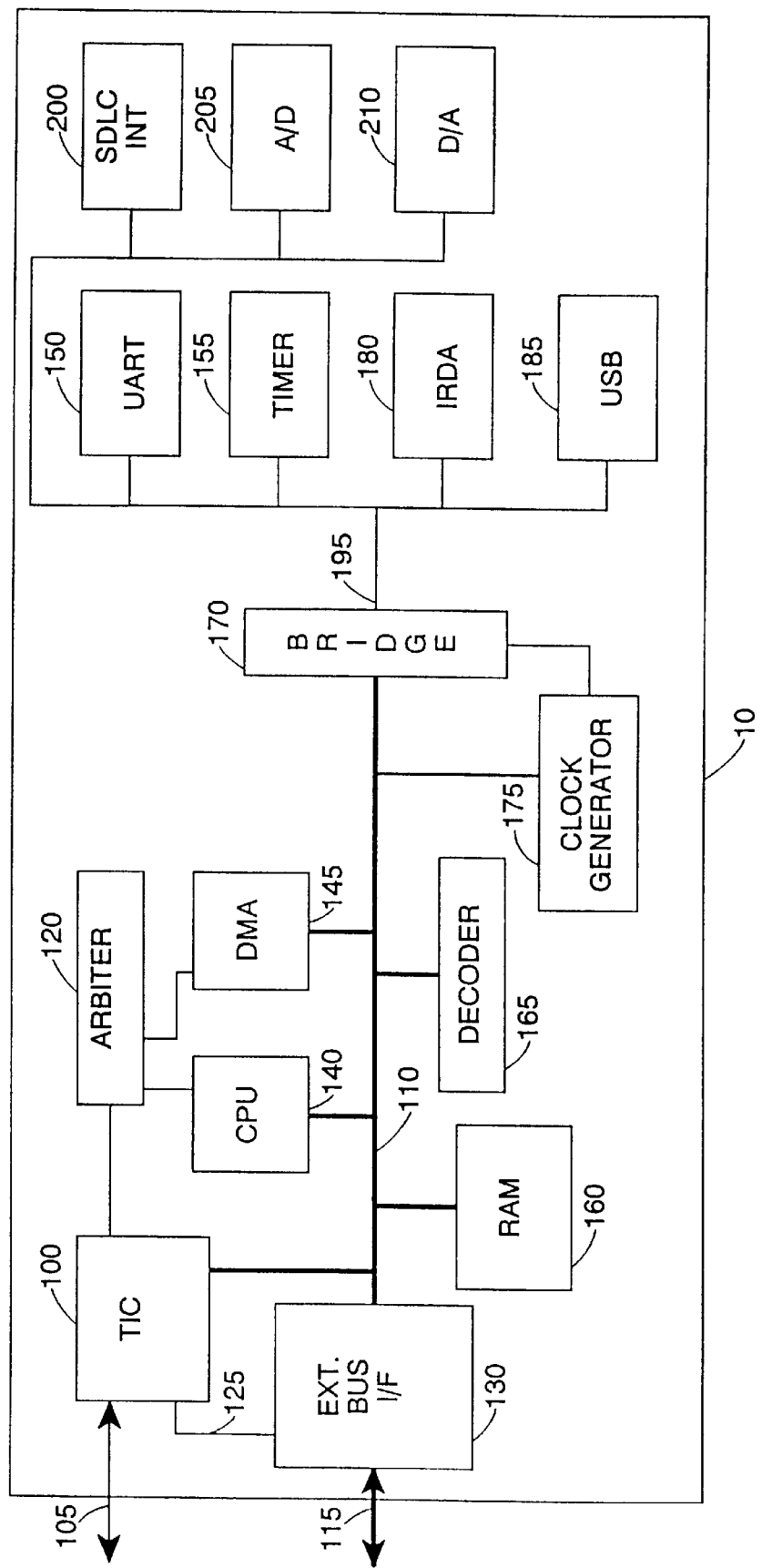
FIG. 1 is a block diagram illustrating a typical prior art integrated circuit.

FIG. 1 illustrates a typical prior art integrated circuit, taking the form of a microcontroller chip 10. The chip 10 has a system bus 110 and a peripheral bus 195 connected via a bridge circuit 170. For the sake of illustration, these buses will be considered to operate in accordance with the "Advanced Microcontroller Bus Architecture" (AMBA) specification developed by ARM Limited. The AMBA specification defines an on-chip communication standard for designing high performance 32-bit and 16-bit embedded microcontrollers, with the system bus 110 being used for high performance system modules, whilst the peripheral bus is used for low power peripheral devices. The high performance system bus 110 is able to sustain the external memory bandwidth, with the CPU and other Direct Memory Access devices residing on the system bus, whilst a bridge circuit 170 connects the system bus to a narrower peripheral bus 195 on which the low bandwidth peripheral devices are located. The bridge circuit 170 performs the necessary protocol conversion between the system bus 110 and the peripheral bus 195.

The chip 10 may have a number of master logic units connected to the system bus 110, for example a test controller (referred to hereafter as a Test Interface Controller (TIC)) 100, a CPU 140 and a DMA controller 145. For the purpose of the current description, the term "master" logic unit is used to refer to a logic unit that is designed to initiate processing requests, whilst logic units that are designed to be recipients of such processing requests will be referred to as "slave" logic units. Only one of the master logic units may have access to the system bus at any particular instance in time, and hence an arbiter 120 is provided to control access to the system bus 110 by the various master logic units. When a master logic unit wishes to have access to the system bus 110, it issues a bus request signal to the arbiter 120. If only one bus request signal is received by the arbiter 120 at any particular instance in time, it will grant access to the master logic unit that issued that bus request signal. However, if more than one bus request signal is received by the arbiter at any particular instance in time, the arbiter is arranged to apply predetermined priority criteria in order to determine which master logic unit should have access to the system bus 110. Of all of the master logic units requesting access to the bus, the arbiter 120 is arranged to grant access to the master logic unit having the highest priority.

In addition to the master logic units, one or more slave logic units may be connected to the system bus 110. For the sake of clarity, only one slave logic unit, namely the Random Access Memory (RAM) 160 is illustrated in FIG. 1. When a transfer request is issued to a slave logic unit, an address will be output on the system bus 110, and this will be decoded by the decoder logic 165 in order to determine which slave logic unit is to handle the transfer request. The decoder will then notify the appropriate slave logic unit accordingly.

The system bus 110 is also connected to an external bus 115 via an external bus interface 130. In preferred embodiments the external bus 115 is a 32-bit vector bus. When performing testing, the external bus interface 130 is used as a test access port, with test data and addresses being input over the external bus 115, whilst the TIC 100 controls the external bus interface 130 over path 125 dependent upon external control signals received by the TIC over path 105.

Further, a clock generator 175 is provided to control the frequency of operation of the various logic units connected to the system bus 110. Hence, the timing of transfer request signals output by a master logic unit is determined by the clock frequency of the clock generator 175.

In accordance with the prior art technique illustrated in FIG. 1, a number of peripheral devices may be connected to the peripheral bus 195. Examples of such peripheral devices are a "Universal Asynchronous Receive and Transmit" (UART) logic unit 150 for receiving and transmitting serial data, a timer 155 used, for example, to generate interrupts, an Infrared Data Association (IrDA) interface 180 used for short range high speed Infrared communication, a Universal Serial Bus (USB) 185, a Synchronous Data Link Control (SDLC) interface 200, and analog-to-digital (A/D) and digital-to-analog (D/A) converters 205 and 210.

In the microcontroller chip 10 illustrated in FIG. 1, the peripheral bus 195 is arranged to operate at the same clock speed as the system bus 110. Hence, the clock signal generated by the clock generator 175 for the system bus 110 is also passed to the bridge 170, which is arranged to generate the necessary clock signals to control the operation of the peripheral units 150, 155, 180, 185, 200, 205 and 210.

When a master logic unit 140, 145 issues a processing request on to the system bus 110 for handling by a peripheral unit connected to the peripheral bus 195, the bridge 170 will receive the processing request signal, will determine which peripheral unit 150, 155, 180, 185, 200, 205 or 210 the processing request is directed to, and will then output the processing request to the appropriate peripheral unit along with the necessary clock signals to control the operation of that peripheral unit. Additionally, prior to outputting the processing request on to the peripheral bus, any necessary protocol conversion steps will be taken by the bridge 170 to convert between the protocol used by the system bus 110 and the protocol used by the peripheral bus 195.

With the structure illustrated in FIG. 1, multiple peripheral units can be connected to the peripheral bus 195 without loading the main system bus 110, and the peripheral bus 195 is only used when a peripheral unit needs to be accessed, thereby reducing overall power consumption.

However, although the provision of the peripheral bus 195 enables the power consumption of the microcontroller chip 10 to be reduced, the actual reduction in power consumption is dependent on the number of peripheral units connected to the peripheral bus 195. In particular, the power consumption of the peripheral bus 195 is proportional to the capacitance of the bus, and the capacitance of the bus increases as more and more peripheral units are connected to the peripheral bus. Hence, as more and more peripheral units are connected to the bus, the overall power savings resulting from the use of the peripheral bus are reduced.

Figure 2:
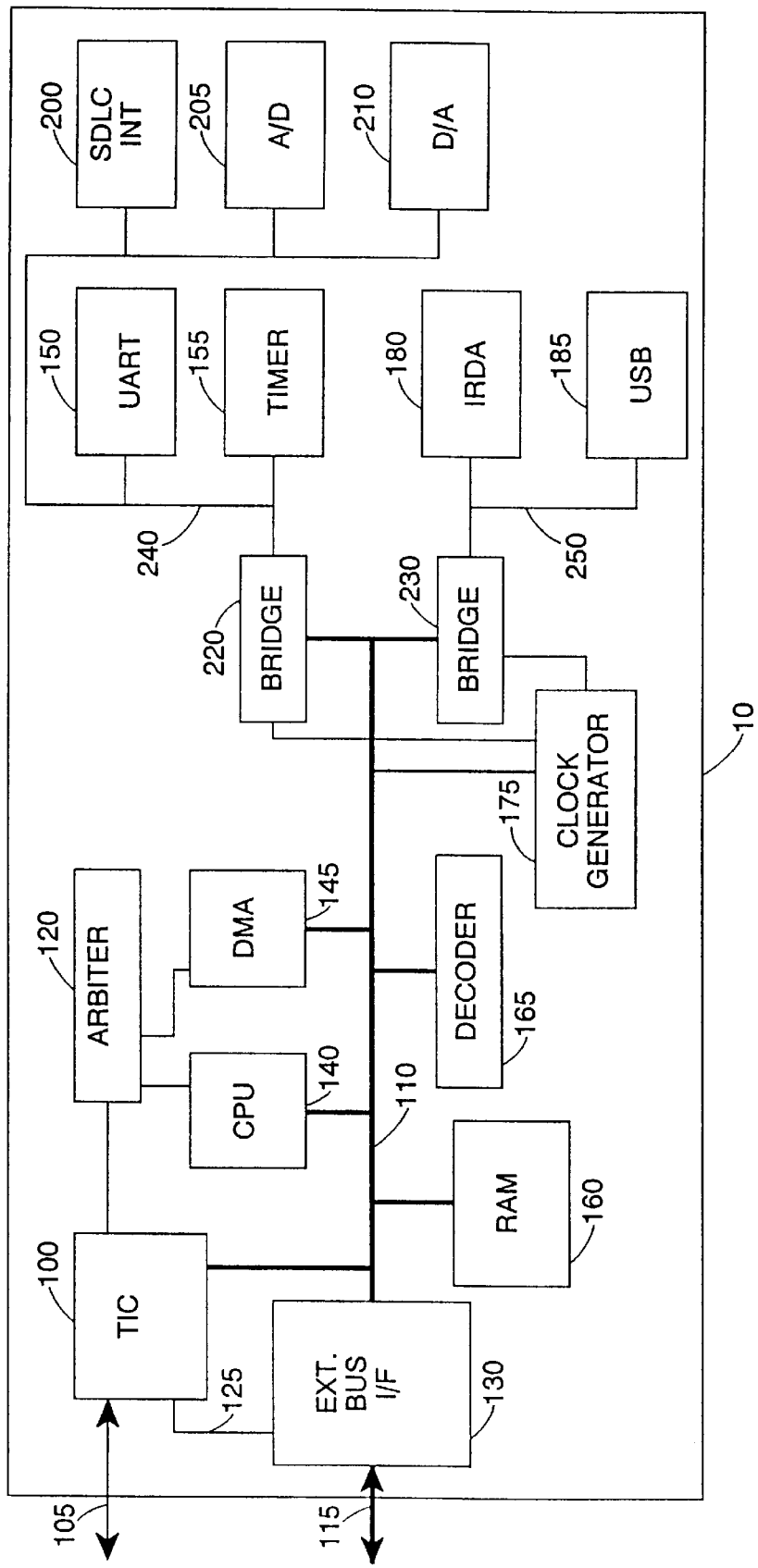
FIG. 2 is a block diagram illustrating an integrated circuit in accordance with a preferred embodiment of the present invention.

In accordance with preferred embodiments of the present invention, this problem is alleviated through the use of two separate peripheral buses as illustrated in FIG. 2. Once again, FIG. 2 illustrates a microcontroller chip 10 which, apart from the alterations made with regards to the peripheral bus, is arranged to operate in accordance with the AMBA specification developed by ARM Limited. It will be appreciated by those skilled in the art that there is no requirement for the data processing apparatus of preferred embodiments to employ the AMBA specification, but rather the discussion of a chip employing the AMBA specification is provided herein merely to illustrate an example of a chip in which the present invention may be employed.

With reference to FIG. 2, elements that correspond to elements in FIG. 1 have the same reference numerals. Hence, with regard to the system bus 110, and the various logic elements connected to the system bus, these operate in an identical manner to that described earlier with reference to FIG. 1. However, with regard to the bridge 170 in FIG. 1, this is replaced in preferred embodiments by two bridges 220 and 230 to which respective peripheral buses 240 and 250 are connected. It will be appreciated by those skilled in the art that, although two separate bridge logic units 220 and 230 have been illustrated in FIG. 2, these could in alternative embodiments be combined within the same bridge logic unit.

In the preferred embodiment, the peripheral bus 250 is arranged to operate at the same clock speed as the system bus 110, and hence can be seen to be analogous to the peripheral bus 195 illustrated in FIG. 1. Thus, the bridge 230 is preferably similar to the bridge 170 illustrated in FIG. 1, and is arranged to perform protocol conversion of signals passed between the system bus 110 and the peripheral bus 250.

The other peripheral bus, namely peripheral bus 240, is arranged to operate at a lower clock speed than the peripheral bus 250, and hence the bridge 220 not only needs to perform the necessary protocol conversion steps, but also is required to generate a clock signal at the appropriate clock speed. Accordingly, the clock generator 175 is arranged not only to generate the clock signal required for the system bus 110, which is also used for the peripheral bus 250, but also to generate a slower clock signal used by the bridge 220 to control the operation of the peripheral bus 240. The manner in which the bridge 220 may be arranged to perform the necessary clock resynchronisation between the system bus 110 and the peripheral bus 240 will be described later with reference to FIGS. 3 and 4.

The power consumption of each peripheral bus 240, 250 is proportional to the clock frequency being used, and the capacitance of that peripheral bus, and hence, for any particular loading, the peripheral bus 250 will tend to consume more power than the peripheral bus 240 since it operates at a higher clock speed. Accordingly, in accordance with preferred embodiments of the present invention, the peripheral units are connected, where possible, to the slower peripheral bus 240. Hence, if a particular peripheral unit is able to operate in accordance with the slower clock speed employed on the peripheral bus 240, then it will be connected to the peripheral bus 240, rather than to the higher speed peripheral bus 250. Although this tends to result in a relatively large number of peripheral units being connected to the peripheral bus 240, and hence the capacitive load of the peripheral bus 240 is relatively high, the power consumption is still relatively good since the clock speed of the peripheral bus 240 is slower than that of the peripheral bus 250.

In preferred embodiments, the clock speed of the slower peripheral bus 240 is chosen to be 3.68 MegaHertz. It has been found that this frequency enables the commonly used clock speeds required by a number of slower peripheral units to be generated. Accordingly, in preferred embodiments, peripheral units such as UART 150, timer 155, SDLC interface 200, A/D converter 205 and D/A converter 210 can all be connected to the slower peripheral bus 240.

This leaves the faster peripheral bus 250 free for use by those peripheral units that actually require the faster clock speed. Examples of such peripheral units are the IrDA interface 180 and the USB 185.

Since, in preferred embodiments, the peripheral bus 250 operates at the same clock speed as the system bus 110, then the peripheral bus 250 can be arranged to support direct memory access (DMA), since no data buffering is needed in the bridge logic 230. Although DMA support is not available on the peripheral bus 240, since some form of data buffering needs to be provided within the bridge logic 220 to account for the differing clock speeds between the system bus 110 and the peripheral bus 240, this is not a problem, since the relatively slow peripheral units typically connected to the peripheral bus 240 do not require DMA.

Typically, a number of the relatively slow speed peripheral units operate at a common clock speed. Accordingly, in preferred embodiments, such peripheral units are connected to the peripheral bus 240, and the peripheral bus 240 is arranged to operate at that common clock speed, thereby avoiding the requirement for separate clock resynchronisation logic to be provided at each of those peripheral units. This approach saves on logic and on power consumption, since the need for multiple synchronisers associated with each peripheral unit is avoided, and instead the resynchronisation is achieved centrally by clock resynchronisation logic provided within the bridge logic 220.

Accordingly, from the above discussion of the preferred embodiment illustrated in FIG. 2, it will be appreciated that the arrangement described in FIG. 2 provides a great deal of flexibility for reducing the power consumption of the microcontroller chip 10 by appropriate positioning of the peripheral units on either the slow peripheral bus 240 or the fast peripheral bus 250. Although, in preferred embodiments, only two peripheral buses are used, it will be appreciated that further peripheral buses, operating at different clock speeds, could also be provided to further enhance the flexibility and potential power savings.

Figure 3:
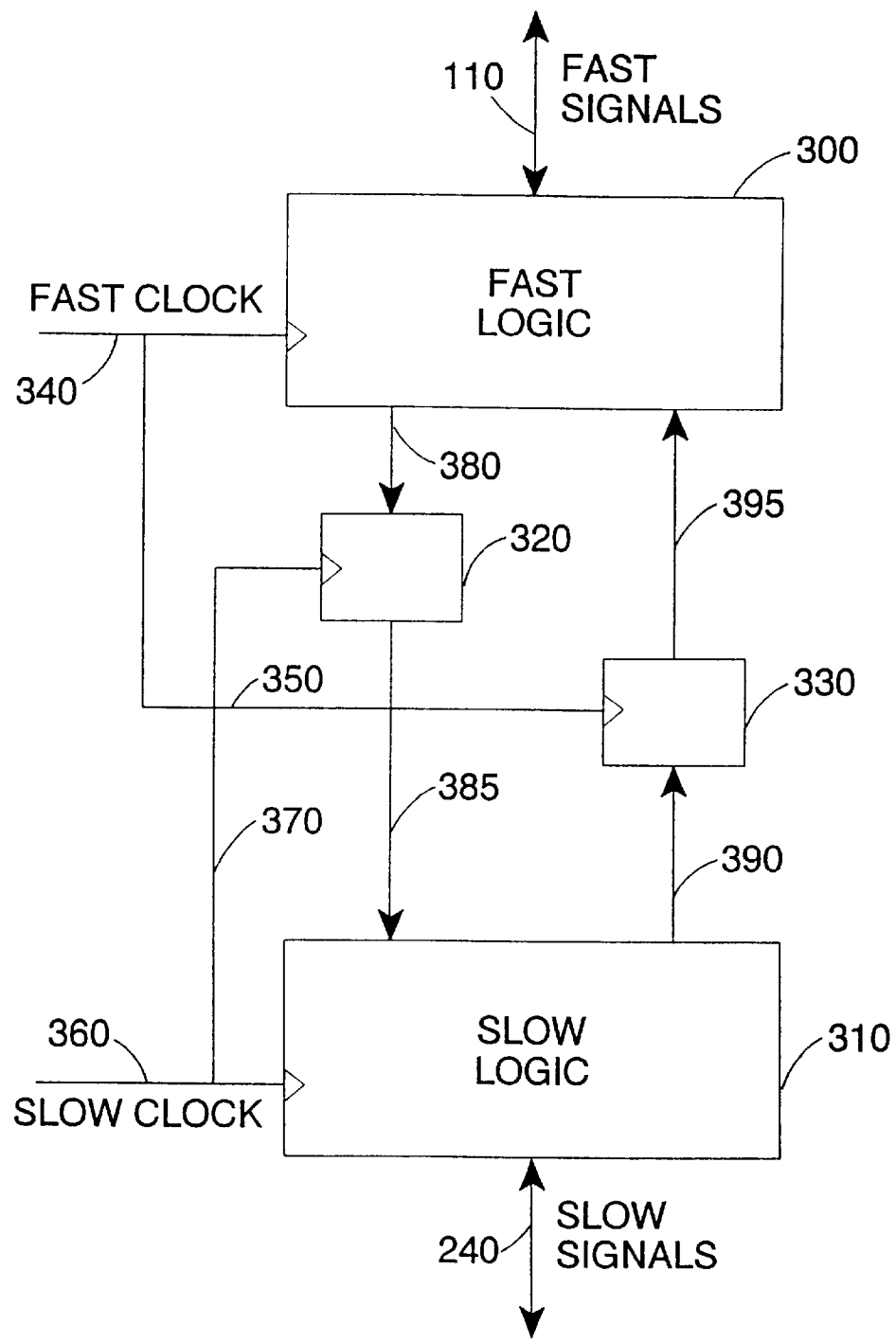
FIG. 3 is a diagram illustrating one embodiment of a bridge logic unit used in the integrated circuit of the preferred embodiment of the present invention.

FIG. 3 is a diagram illustrating the logic provided within the bridge logic unit 220 in accordance with the first embodiment of the present invention in order to perform the necessary clock resynchronisation between the clock speed used on the system bus 110, and the slower clock speed used on the peripheral bus 240. In accordance with this first embodiment, the bridge logic unit 220 can basically be considered as consisting of two logic blocks, namely a fast logic block 300 and a slow logic block 310. The fast logic block 300 is arranged to receive signals from the system bus 110, and to output signals on to the system bus 110, and also applies the necessary protocol conversion for signals received from, and output on to, the system bus 110. Similarly, the slow logic block 310 interfaces with the slow peripheral bus 240, and is responsible for outputting signals on to the peripheral bus 240, and receiving signals from the peripheral bus 240. Further, the slow logic block 310 is responsible for performing the necessary protocol conversion for signals output on to, and received from, the peripheral bus 240.

The fast logic block 300 operates in accordance with a clock signal provided over path 340 from the clock generator 175. In preferred embodiments, this clock signal has a clock speed of approximately 30 MegaHertz, this being the clock speed of the system bus 110, and the peripheral bus 250. The slow logic block 310, on the other hand, operates in accordance with a slow clock signal received over path 360 from the clock generator 175. As mentioned previously, in preferred embodiments, this slow clock signal has a clock speed of 3.68 MegaHertz.

When a signal is received by the fast logic 300 from the system bus 110, it is output over path 380 to the D-type flip-flop 320, the flip-flop 320 operating in accordance with the slow clock signal passed over path 370 to the flip-flop 320. On the rising edge of the clock signal, the flip-flop 320 is arranged to sample the input signal passed over path 380, and to drive the input signal at its output over path 385 to the slow logic unit 310. In preferred embodiments, by the time the signal output over path 385 is used by the slow logic unit 310, the output value will be stable. By this approach, it will be appreciated that the signals received over path 385 by the slow logic unit 310 are re-synchronised based on the slow clock signal. Hence, the slow logic unit 310 can perform the necessary protocol conversion, and then output the signals on to the peripheral bus 240.

Similarly, when signals are received from the slow peripheral bus 240 by the slow logic unit 310, these signals are passed over path 390 to the D-type flip-flip 330, this flip-flop 330 being driven in accordance with the fast clock signal passed over path 350. Hence, on the rising edge of the clock signal, the flip-flop 330 samples its input and outputs that input signal over path 395 to the fast logic unit 300. Accordingly, it can be seen that the flip-flop 330 causes the signal to be re-synchronised in accordance with the fast clock signal. Thus, the fast logic unit 300 can apply the necessary protocol conversion, and then output the signal on to the system bus 110.

Figure 4:
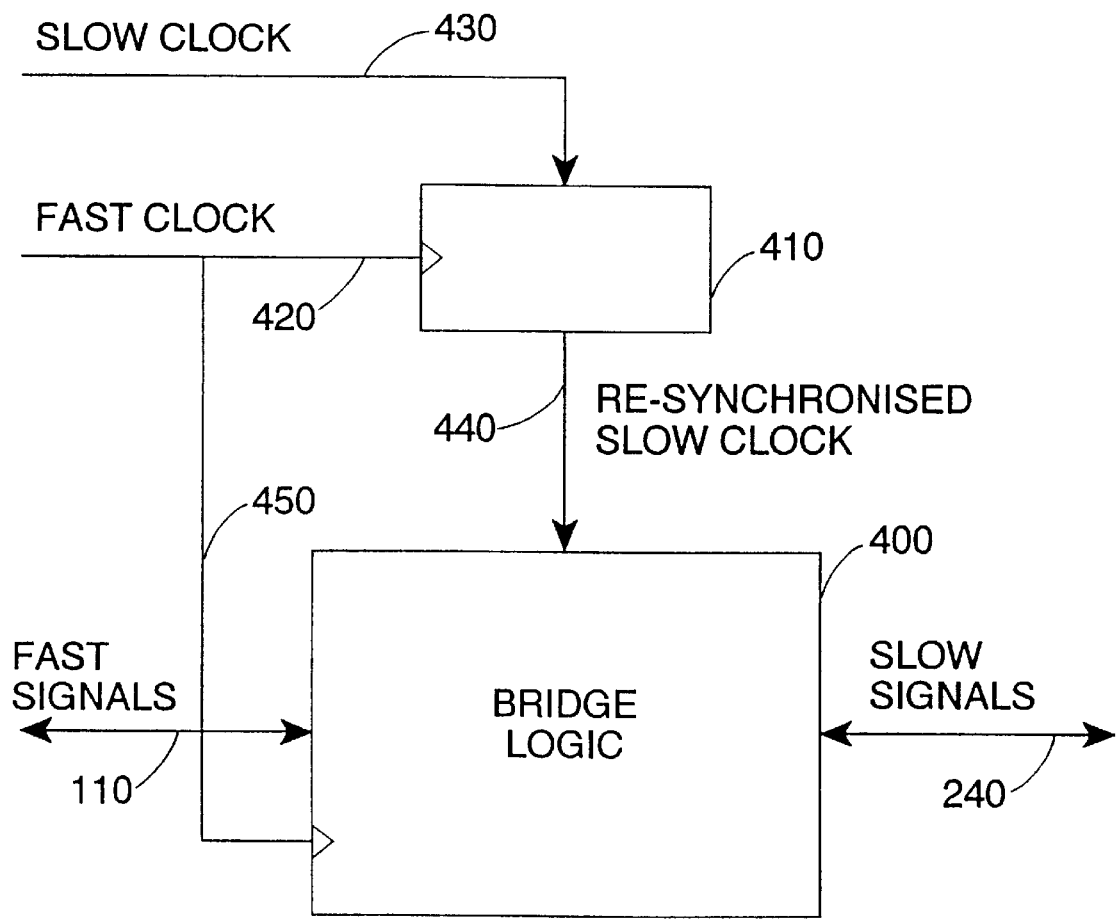
FIG. 4 is a diagram illustrating an alternative embodiment of a bridge logic unit used in the integrated circuit of the preferred embodiment of the present invention.

An alternative embodiment for the bridge logic 220 illustrated in FIG. 2 is shown in FIG. 4. In accordance with this alternative embodiment, the bridge logic 400, which is arranged to perform the necessary protocol conversion between the protocol used on the system bus 110 and the protocol used on the slow peripheral bus 240, and the D-type flip-flop 410 are both driven by the fast clock signal generated by the clock generator 175 and passed over paths 450 and 420, respectively. However, in this embodiment, the input to the D-type flip-flop 410 is the slow clock signal 430. Accordingly, on the rising edge of the fast clock signal passed over path 420 to the D-type flip-flop 410, the input is sampled, and driven via the output over path 440 to the bridge logic 400. This causes the edges of the slow clock to be shifted so as to be coincident with the edges of the fast clock.

As mentioned earlier, the bridge logic 400 is driven by the fast clock as input to the bridge logic over path 450.

However, as a separate input, it also receives the data over path 440 relating to the slow clock. Hence, for signals received from the system bus 110, logic within the bridge logic unit 400 can be used to determine, based on the fast clock signal, and on the data received over path 440, when to output signals on to the peripheral bus 240. Similarly, for slow signals received from the peripheral bus 240, the bridge logic 400 can determine from the fast clock signal input over path 450, and the data input over path 440, when to sample the signals on the peripheral bus 240 and subsequently drive them on to the system bus 110.

From the above description of the preferred embodiment of the present invention, it will be appreciated that, through the provision of first and second peripheral buses operating at different clock speeds, a data processing apparatus has been described which provides a great deal of flexibility for reducing the power consumption of the integrated circuit, when compared with a similar integrated circuit having only one peripheral bus. To optimise the power consumption savings, the peripheral units are connected to the slowest peripheral bus appropriate for that peripheral unit, with the capacitive load on the higher speed peripheral bus being kept to a minimum by connecting as few peripheral units to that higher speed peripheral bus as possible.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. An integrated circuit comprising:

a system bus to which a processor is connectable;

first and second peripheral buses to which peripheral units used by said processor are connected, said first peripheral bus operating at a higher clock speed than said second peripheral bus;

bridge logic for providing an interface between said system bus and said peripheral buses to enable signals to be passed between said system bus and said peripheral buses, said bridge logic comprising clock resynchronisation logic for synchronising said system bus and said peripheral buses.

2. An integrated circuit as claimed in claim 1, wherein said bridge logic comprises first and second bridge logic units, said first bridge logic unit being arranged to provide an interface between said system bus and said first peripheral bus, and said second bridge logic unit being arranged to provide an interface between said system bus and said second peripheral bus.

3. An integrated circuit as claimed in claim 2, wherein said first peripheral bus is arranged to operate at the same clock speed as said system bus, and said clock resynchronisation logic is provided in said second bridge logic unit, but not in said first bridge logic unit.

4. An integrated circuit as claimed in claim 1, wherein said first peripheral bus is arranged to operate at the same clock speed as said system bus.

5. An integrated circuit as claimed in claim 4, wherein said first peripheral bus supports direct memory access (DMA), and peripheral units requiring DMA are connected to said first peripheral bus.

6. An integrated circuit as claimed in claim 1, wherein a number of said peripheral units require a common clock speed and are connected to said second peripheral bus, said second peripheral bus being arranged to operate at said common clock speed, thereby avoiding the requirement for separate clock resynchronisation logic to be provided at each of said number of peripheral units.

7. An integrated circuit as claimed in claim 1, wherein said first and said second peripheral buses employ the same bus protocol, the system bus employs a different bus protocol, and the bridge logic includes protocol conversion logic for performing the necessary protocol conversion on signals passed between the system bus and the peripheral buses.

8. An integrated circuit as claimed in claim 1, wherein said second peripheral bus operates at a clock speed chosen so as to enable a commonly used clock speed required by a number of said peripheral units to be generated.

9. An integrated circuit as claimed in claim 8, wherein said second peripheral bus operates at a clock speed of 3.68 MHz.

10. An integrated circuit as claimed in claim 1, further comprising one or more additional peripheral buses arranged to operate at clock speeds different to the clock speeds of said first and said second peripheral buses.

11. An integrated circuit as claimed in claim 1, wherein said integrated circuit is a microcontroller.

* * * * *